United States Patent
Terawaki

[19]

[11] Patent Number: 6,098,684
[45] Date of Patent: Aug. 8, 2000

[54] ULTRASONIC WELDING/CUTTING MACHINE

[75] Inventor: Toyofumi Terawaki, Nagoya, Japan

[73] Assignee: Brother Kogyo Kabushiki Kaisha, Nagoya, Japan

[21] Appl. No.: 09/049,936

[22] Filed: Mar. 30, 1998

[30] Foreign Application Priority Data

| Mar. 31, 1997 | [JP] | Japan | 9-081032 |
| Jan. 23, 1998 | [JP] | Japan | 10-011132 |

[51] Int. Cl.[7] .......................... B32B 31/00; B29C 35/08; B29C 35/10
[52] U.S. Cl. ................. 156/353; 156/361; 156/580.1; 156/580.2; 425/174.2
[58] Field of Search .................... 156/64, 73.1, 73.3, 156/73.5, 580.1, 580.2, 308.4, 353, 358, 361; 425/174.2

[56] References Cited

U.S. PATENT DOCUMENTS

| 3,242,029 | 3/1966 | Deans | 156/73.1 |
| 3,844,869 | 10/1974 | Rust, Jr. | 156/358 |
| 3,993,532 | 11/1976 | McDonald et al. | 156/580.1 |
| 4,333,791 | 6/1982 | Onishi | 156/580.1 |
| 4,713,132 | 12/1987 | Abel et al. | 156/73.1 |
| 5,061,331 | 10/1991 | Gute | 156/64 |
| 5,658,408 | 8/1997 | Frantz et al. | 156/64 |
| 5,749,987 | 5/1998 | Wannebo | 156/64 |
| 5,772,814 | 6/1998 | Grewell | 156/64 |

FOREIGN PATENT DOCUMENTS

| 62-7465 U | 1/1987 | Japan . |
| B2-62-8296 | 2/1987 | Japan . |
| 6-297608 | 10/1994 | Japan . |
| 1018971 | 2/1966 | United Kingdom . |
| 1167549 | 10/1969 | United Kingdom . |
| 1524924 | 9/1978 | United Kingdom . |

OTHER PUBLICATIONS

Akini Sasagawa, "Ultrasonic Welding Machine for Films Made of Synthetic Resin", tranlation of Japanese Patent No. 62–8296, Feb. 1997.

*Primary Examiner*—Richard Crispino
*Assistant Examiner*—Sue A. Purvis

[57] ABSTRACT

An ultrasonic welding/cutting machine includes an ultrasonic machining unit including a machining roller and a tool horn to which ultrasonic waves are transmitted. The ultrasonic machining unit welds or cuts a sheet material such as unwoven fabric by feeding the sheet material between the machining roller and the tool horn. The machine further includes the construction for moving the ultrasonic machining unit in a direction generally perpendicular to a direction in which the sheet material is fed, the construction for rotating the machining roller on its axis, and the construction for turning the machining roller.

20 Claims, 14 Drawing Sheets

ULTRASONIC WELDING/CUTTING MACHINE

BACKGROUND OF THE INVENTION

1. Field of the Invention

This invention relates to an ultrasonic welding/cutting machine which holds a sheet material such as film or unwoven fabric between a machining roller and a tool horn to which ultrasonic waves are transmitted, thereby welding or cutting the sheet material.

2. Description of the Related Art

Japanese patent publication No. 62-8296-B (1987) discloses an ultrasonic welding machine of the type described above. Japanese utility model publication No. 62-7465-B (1987) also discloses another ultrasonic welding machine of the above-described type. The welding machine disclosed in the former publication comprises a feeding mechanism for feeding a sheet material, a horn rotating mechanism for rotating a tool horn in response to a sheet feeding operation, a roller rotating mechanism for rotating a machining roller in response to the sheet feeding operation, and a moving mechanism for moving the tool horn and machining roller or an ultrasonic machining unit in a direction generally perpendicular to a direction in which the sheet material is fed. The sheet material, while being fed, is welded or cut by the tool horn and machining roller, so that a welded line or cut line, namely, a post-machining straight line extending in the same direction that the sheet material is fed is obtained. Furthermore, when the tool horn and machining roller are moved in the direction generally perpendicular to the direction in which the sheet material is fed, with the sheet material remaining stationary, a post-machining straight line extending in the direction generally perpendicular to the direction in which the sheet material is fed. In this construction, however, a curved line cannot be obtained when the sheet material has been welded or cut.

On the other hand, Japanese patent publication No. 6-297608-A (1994) discloses an ultrasonic welding machine in which the sheet material is machined curvilinearly so that a curved line is obtained. In the disclosed machine, the machining roll and the tool horn have respective special shapes in order that a required curved line may be obtained. However, the machining roller and the tool horn respectively having special shapes are expensive. Furthermore, since the shapes of the machining roller and the tool horn need to be changed depending upon the types of the curved lines, a large number of types of machining rollers and tool horns must be prepared. This increases the cost of the ultrasonic welding machine. Additionally, since the shapes of obtained curved lines are already determined by the prepared machining rollers and tool horns, a desired post-machining shape cannot sometimes be obtained.

SUMMARY OF THE INVENTION

Therefore, an object of the present invention is to provide an ultrasonic welding/cutting machine in which a machining curve of the sheet material can be obtained as the post-machining shape, the cost thereof can be reduced, and a desired post-machining shape can be obtained.

The present invention provides an ultrasonic welding/cutting machine comprising an ultrasonic machining unit including a machining roller and a tool horn to which ultrasonic waves are transmitted, the ultrasonic machining unit welding or cutting a sheet material by feeding the sheet material between the machining roller and the tool horn, unit moving means for moving the ultrasonic machining unit in a direction generally perpendicular to a direction in which the sheet material is fed, roller rotating means for rotating the machining roller on an axis thereof, and roller turning means for turning the machining roller.

According to the above-described machine, the unit moving means, the roller rotating means and the roller turning means are controlled so that while the sheet material is being fed, the ultrasonic machining unit (the machining roller and the tool horn) is reciprocally moved in the direction generally perpendicular to the direction in which the sheet material is fed. When a feed speed of the sheet material, a moving speed and a moving direction of the ultrasonic machining unit are adjusted, a machining straight line oblique to the feeding direction of the sheet material and a desired curve can be obtained as the post-machining shape of the sheet material. In particular, the machining roller is turnable in the above-described construction. The machining roller is turned when the ultrasonic machining unit is moved with the sheet material being fed. Consequently, since the sheet material is prevented from occurrence of crease etc., the quality of the machined sheet material can be improved.

In a preferred form, the unit moving means includes horn moving means for reciprocally moving the tool horn in the direction generally perpendicular to the direction in which the sheet material is fed, and roller moving means for reciprocally moving the machining roller in the same direction that the tool horn is reciprocally moved. Furthermore, the ultrasonic welding/cutting machine preferably further comprises sheet feeding means for feeding the sheet material and control means for controlling the sheet feeding means, the unit moving means, the roller rotating means, and the roller turning means. In this construction, the control means preferably sets a feed speed of the sheet material, a moving speed of the ultrasonic machining unit, a rotational speed of the machining roller, and a moving speed of the machining roller on the basis of a machining speed at which welding or cutting for the sheet material progresses and a turning angle of the machining roller. Furthermore, the control means preferably sets the machining speed and the turning angle of the machining roller on the basis of a post-machining shape set thereto.

In another preferred form, the ultrasonic welding/cutting machine further comprises feed speed detecting means for detecting a feed speed of the sheet material, horn rotating means for rotating the tool horn, and control means for controlling the horn rotating means, the horn moving means, the roller rotating means, the roller moving means, and the roller turning means. In this construction, the control means sets a rotational speed of the tool horn, a moving speed of the tool horn, a rotational speed of the machining roller, a moving speed of the machining roller, and a turning angle of the machining roller on the basis of the feed speed detected by the feed speed detecting means and a post-machining shape set thereto. Furthermore, the control means preferably sets a rotational speed of the tool horn, a moving speed of the tool horn, a rotational speed of the machining roller, a moving speed of the machining roller, and a turning angle of the machining roller on the basis of a feed speed of the sheet material and a post-machining shape both set thereto.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENTS

Figure 2:
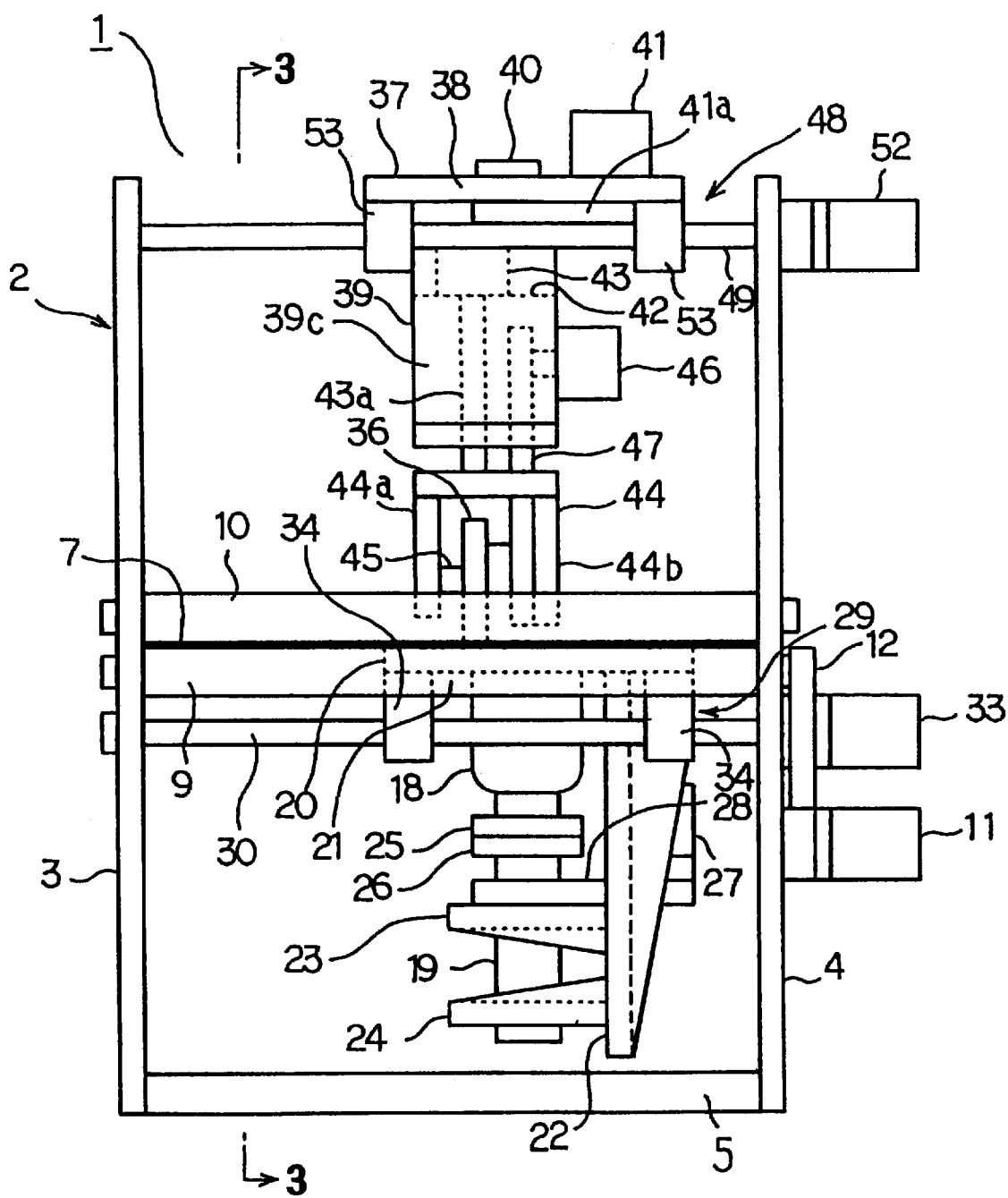
FIG. 2 is a front view of the machine.
Figure 3:
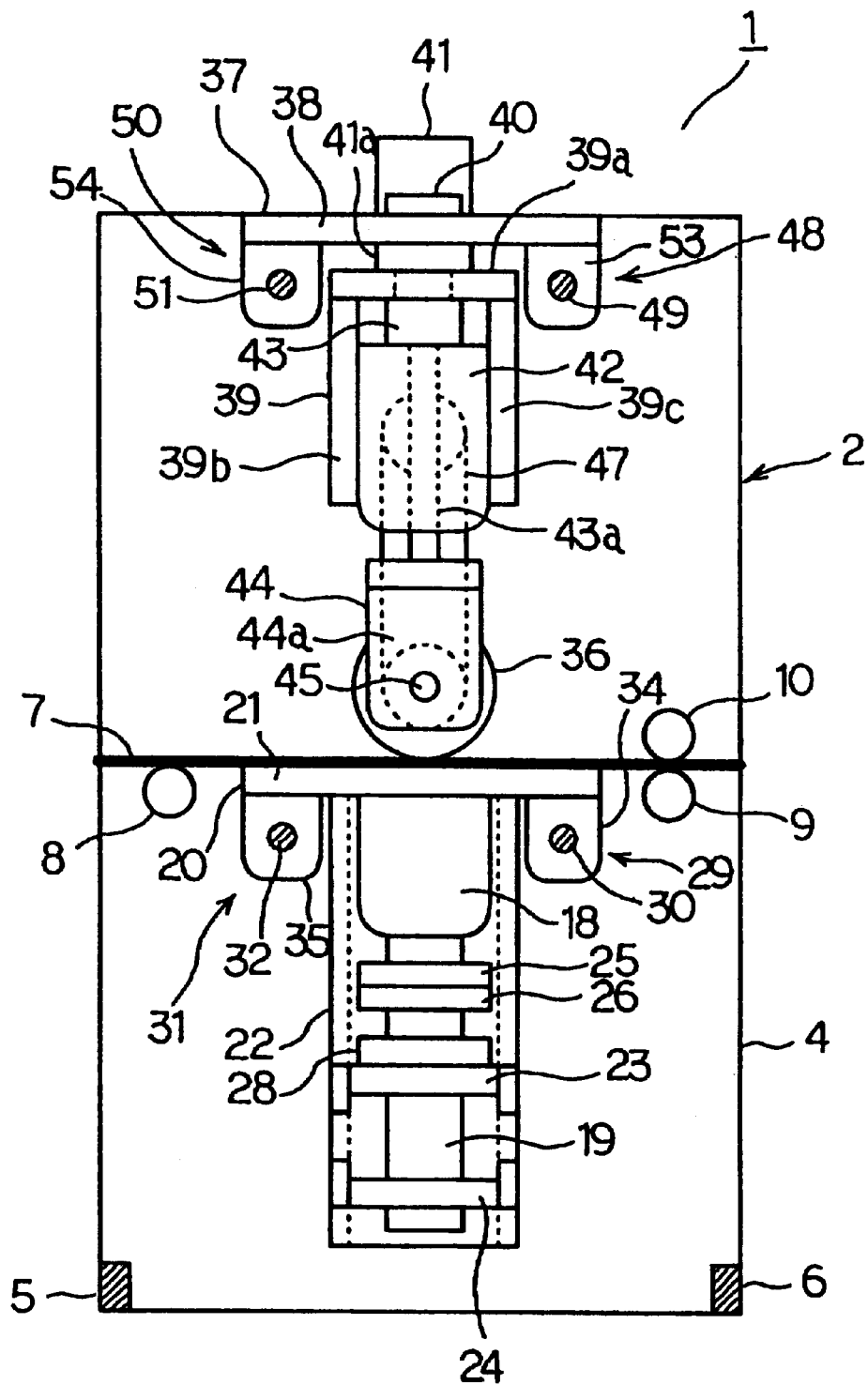
FIG. 3 is a longitudinal side sectional view of the machine taken along line 3–3 in FIG. 2.
Figure 4:
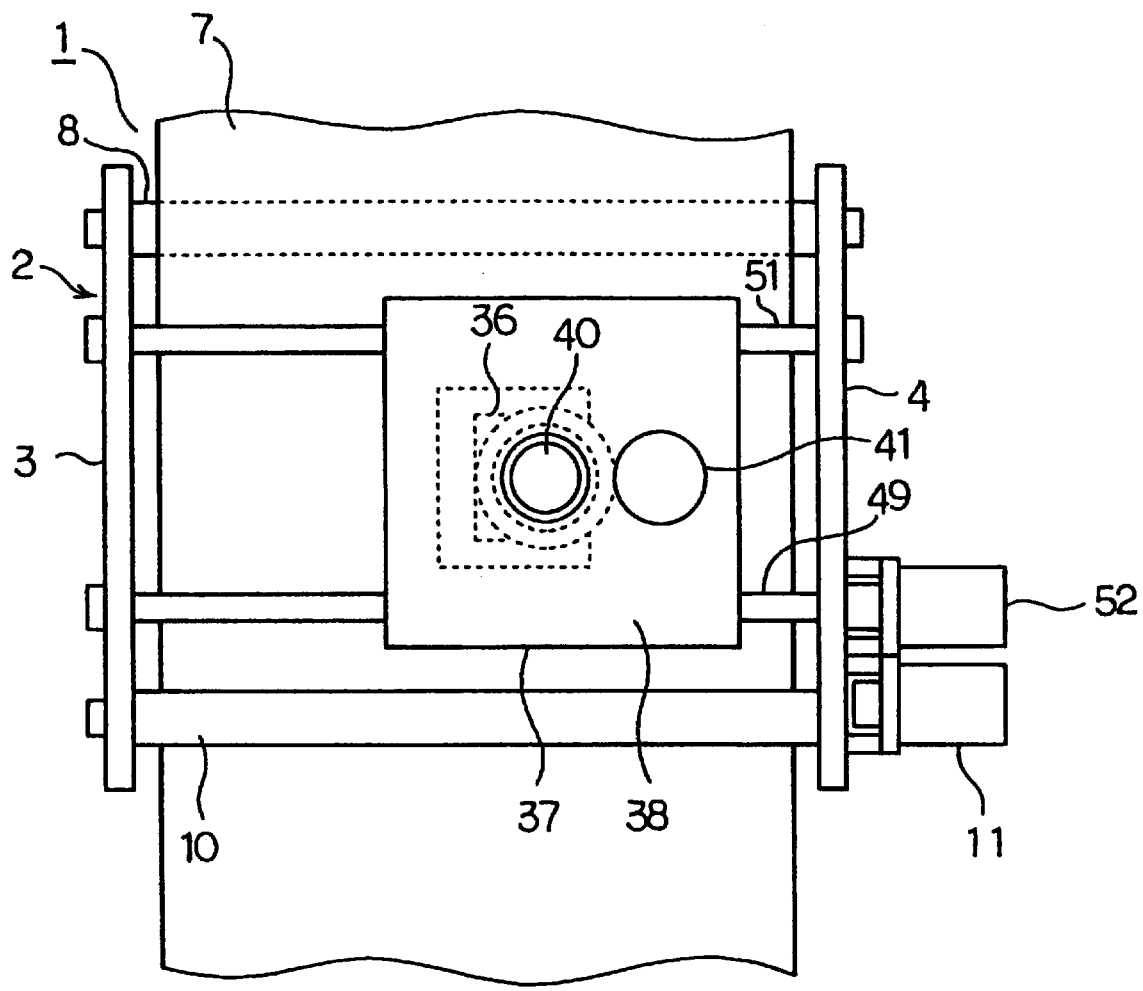
FIG. 4 is a top plan view of the machine.

A first embodiment of the present invention will be described with reference to FIGS. 1 to 12. Referring first to FIGS. 2 to 4, the ultrasonic welding/cutting machine 1 in accordance with the invention is shown. The ultrasonic welding/cutting machine 1 comprises a body frame 2 including spaced apart parallel disposed left-hand and right-hand side plates 3 and 4, and front and rear connecting members 5 and 6 connecting front and rear lower ends with each other respectively. Three rollers 8, 9 and 10 are rotatably mounted on vertically middle portions of the side plates 3 and 4 so as to extend therebetween. A sheet material 7 is transferred by the rollers 8 to 10 horizontally or rightward as viewed in FIG. 3. The roller 8 is disposed on the left ends of the side plates 3 and 4 so that the sheet material 7 is placed thereon, as viewed in FIG. 3. The rollers 10 and 9 are disposed up and down on the right ends of the side plates 3 and 4 so as to hold the sheet material 7 therebetween, as viewed in FIG. 3.

The lower roller 9 is rotated via a belt transmission mechanism 12 by a roller driving motor 11. The roller driving motor 11 comprises an AC servo motor, for example. Upon drive of the roller driving motor 11, the roller 9 is rotated to feed the sheet material 7 rightward as viewed in FIG. 3. The roller driving motor 11 thus constitutes sheet feeding means for feeding the sheet material 7 in the invention. The belt transmission mechanism 12 comprises a driving pulley mounted on a rotational shaft of the roller driving motor 11, a driven pulley mounted on the roller 9, and a transmission belt connecting between these pulleys.

Figure 5:
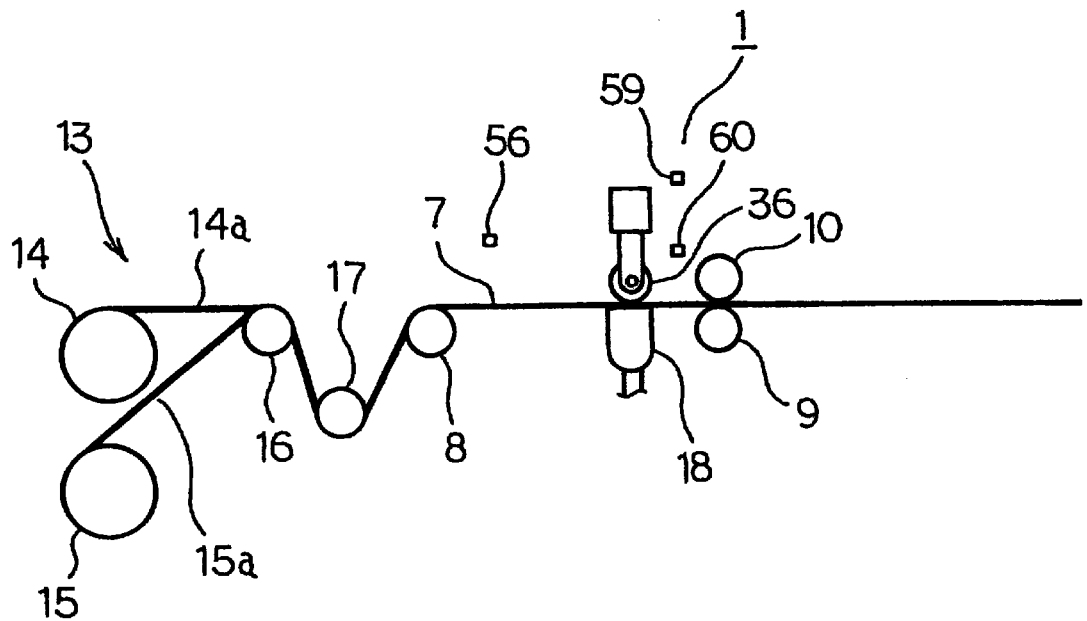
FIG. 5 is a schematic side view of the machine and a sheet material feeding apparatus.
Figure 6:
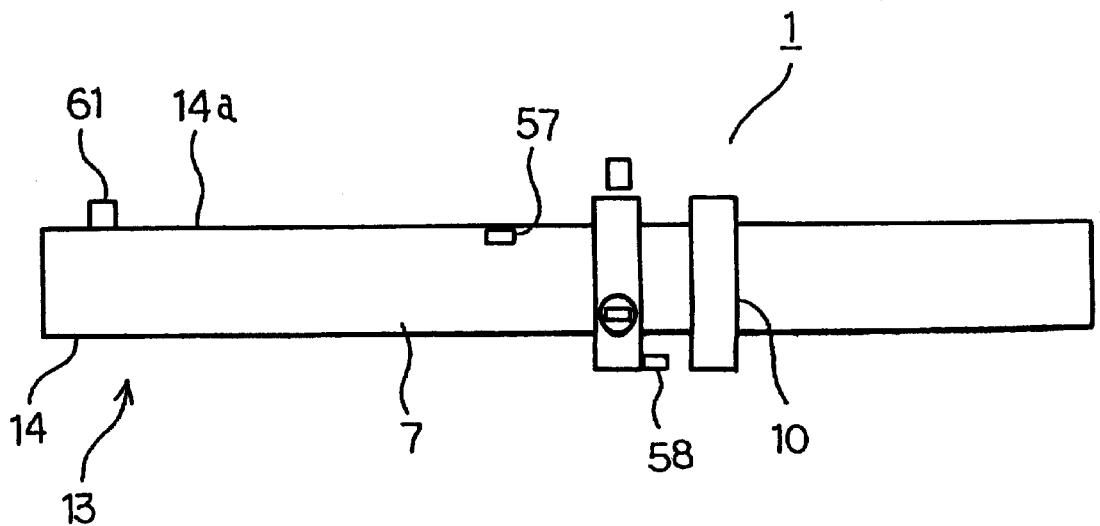
FIG. 6 is a schematic plan view of the machine and the sheet material feeding apparatus.

The sheet material 7 is formed by superposing two sheets of unwoven fabric, for example. The sheet material 7 is supplied from a sheet material feeder 13 to the ultrasonic welding/cutting machine, as shown in FIGS. 5 and 6. Two upper and lower rolls 14 and 15 on which two sheets 14a and 15a of unwoven fabric are wound respectively are provided on the left-hand portion of the sheet material feeder 13, as viewed in FIG. 5. The rolls 14 and 15 are rotatable. Two guide rollers 16 and 17 are rotatably mounted on the right of the rolls 14 and 15 as viewed in FIG. 5. Two unwoven fabric sheets 14a and 15a fed from the respective rolls 14 and 15 are superposed together and guided rightward by the guide rollers 16 and 17 to be supplied to the roller 8 of the ultrasonic welding/cutting machine.

Each of the unwoven fabric sheets 14a and 15a is made from a synthetic resin such as nylon, polyester or polypropylene. The sheet material 7 should not be limited to the unwoven fabric sheets 14a and 15a. A synthetic resin film, chemical fiber fabric or glass fiber fabric may be used, instead. Furthermore, three or more superposed sheets of the above-described fabric or film may be used. Additionally, a single sheet of the above-described fabric or film may be used as the sheet material 7 when only the ultrasonic cutting is executed.

Referring to FIGS. 2 and 3, a tool horn 18 and an ultrasonic transducer 19 are disposed below the sheet material 7 fed in the body frame 2 of the ultrasonic welding/cutting machine 1. The tool horn 18 and the ultrasonic transducer 19 are reciprocally movable in a direction generally perpendicular to a direction in which the sheet material 7 is fed, that is, leftward and rightward in FIG. 2.

The construction for reciprocally moving the tool horn 18 and the ultrasonic transducer 19 will now be described. The tool horn 18 and the ultrasonic transducer 19 are mounted on a first moving member 20. The moving member 20 comprises a horizontally disposed base 21 and a support plate 22 downwardly projecting from the underside of the base 21. Two spaced apart mounting members 23 and 24 are mounted on the lower left-hand side of the support plate 22 to leftwardly extend in parallel with each other. The mounting members 23 and 24 are formed with respective through holes in which the generally cylindrical ultrasonic transducer 19 is rotatably mounted. The ultrasonic transducer 19 has on the top thereof two connecting members 25 and 26 to which the tool horn 18 is connected. As a result, ultrasonic oscillations generated by the ultrasonic transducer 19 are transmitted to the tool horn 18.

A horn rotating motor 27 is mounted on the right-hand side of the support plate 22 as viewed in FIG. 2. A rotating force developed by the horn rotating motor 27 is transmitted via a belt transmission mechanism 28 to the ultrasonic transducer 19 and accordingly, to the tool horn 18. Thus, the tool horn 18 is rotated by the horn rotating motor 27. The horn rotating motor 27 constitutes horn rotating means in the invention. The horn rotating motor 27 comprises an AC servo motor, for example. The belt transmission mechanism 28 comprises a driving pulley mounted on a rotational shaft of the horn rotating motor 27, a driven pulley mounted on the ultrasonic transducer 19, and a transmission belt connecting between these pulleys.

A threaded rod 30 constituting a ball screw 29 and a guide bar 32 constituting a ball guide 31 are disposed in parallel with each other below the base 21 of the first moving member 20 between the side plates 3 and 4 of the body frame 2. The threaded rod 30 has a threaded portion in an outer periphery thereof and is rotatably mounted on the side plates 3 and 4. The guide bar 32 is fixed to the side plates 3 and 4. The threaded rod 30 is reversibly rotated by a tool horn feeding motor 33 mounted on the right-hand side of the right-hand side plate 4. The tool horn feeding motor 33 constitutes horn moving means in the invention. The tool horn feeding motor 33 comprises an AC servo motor, for example.

Two bearings 34 are provided on the underside of the base 21. The bearings 34 are threadingly engaged with the threaded rod 30 to constitute the ball screw 29. Two bearings 35 are further provided on the underside of the base 21. The guide bar 32 is slidably fitted into the bearings 35. The bearings 35 thus constitute the ball guide 31. When the threaded rod 30 is rotated by the tool horn feeding motor 33, the bearings 34 and accordingly, the base 21 are moved leftward or rightward depending upon the rotational direction of the threaded rod 30, as viewed in FIG. 2. Accordingly, the tool horn feeding motor 33 is rotated in the normal or reverse direction so that the first moving member 20 and accordingly, the tool horn 18 and ultrasonic transducer 19 are moved leftward or rightward, as viewed in FIG. 2.

A machining roller 36 is provided above the sheet material 7 in the body frame 2 of the ultrasonic welding/cutting machine 1. The machining roller 36 is mounted to be reciprocally movable in the direction generally perpendicular to the direction in which the sheet material 7 is fed, that is, leftward and rightward in FIG. 2.

The construction for the reciprocal movement of the machining roller 36 will now be described. The machining roller 36 is mounted on a second moving member 37. The second moving member 37 comprises a horizontally disposed base 38 and a generally C-shaped rotatable support member 39 extending downward from the underside of the base 38. The base 38 has a central through hole through which a turning shaft 40 is rotatably mounted. The turning shaft 40 has a lower end to which an upper wall 39a (see FIG. 3) of the support member 39 is connected. An axis of the turning shaft 40 is adapted to be aligned with an axis of the cylindrical portion 18a of the tool horn 18.

A machining roller turning motor 41 is mounted on the top of the base 38. A rotating force developed by the machining roller turning motor 41 is transmitted via a belt transmission mechanism 41a to the turning shaft 40. Thus, the turning shaft 40 and the support member 39 are rotated by the machining roller turning motor 41. The machining roller turning motor 41 constitutes roller turning means in the invention. The machining roller turning motor 41 comprises an AC servo motor, for example. The belt transmission mechanism 41a comprises a driving pulley mounted on a rotational shaft of the machining roller turning motor 41, a driven pulley mounted on the turning shaft 40, and a transmission belt connecting between these pulleys.

A machining roller unit 42 is disposed between opposite side walls 39b and 39c of the support member 39, as shown in FIG. 3. A lift cylinder 43 is provided on the top of the machining roller unit 42 for raising and lowering the machining roller 36. The lift cylinder 43 includes an expanding and contracting rod 43a having a lower end on which a generally C-shaped roller support member 44 is provided. The roller support member 44 has opposite side walls 44a and 44b between which the machining roller 36 is rotatably mounted via a shaft 45.

The machining roller 36 is rotated via a belt transmission mechanism 47 by a machining roller rotating motor 46 mounted on the right-hand side of the machining roller unit 42, as viewed in FIG. 2. The machining roller rotating motor 46 thus constitutes roller rotating means in the invention. The machining roller rotating motor 46 comprises an AC servo motor, for example. The belt transmission mechanism 47 comprises a driving pulley mounted on a rotational shaft of the machining roller rotating motor 46, a driven pulley mounted on the shaft 45 of the machining roller 36, and a transmission belt connecting between these pulleys. The roller support member 44 and accordingly the machining roller 36 are vertically moved by the lift cylinder 43.

A threaded rod 49 constituting a ball screw 48 and a guide bar 51 constituting a ball guide 50 are disposed in parallel with each other below the base 38 of the second moving member 37 between the side plates 3 and 4 of the body frame 2. The threaded rod 49 has a threaded portion in an outer periphery thereof and is rotatably mounted on the side plates 3 and 4. The guide bar 51 is fixed to the side plates 3 and 4. The threaded rod 49 is reversibly rotated by a machining roller feeding motor 52 mounted on the right-hand side of the right-hand side plate 4. The machining roller feeding motor 52 constitutes roller moving means in the invention. The machining roller feeding motor 52 comprises an AC servo motor, for example.

Two bearings 53 are provided on the underside of the base 38. The bearings 53 are threadingly engaged with the threaded rod 49 to constitute the ball screw 48. Two bearings 54 are further provided on the underside of the base 38. The guide bar 51 is slidably fitted into the bearings 54. The bearings 54 thus constitute the ball guide 50. When the threaded rod 49 is rotated by the machining roller feeding motor 52, the bearings 53 and accordingly, the base 38 are moved leftward or rightward depending upon the rotational direction of the threaded rod 49, as viewed in FIG. 2. Accordingly, the machining roller feeding motor 52 is rotated in the normal or reverse direction so that the second moving member 37 and accordingly, the machining roller 36 are moved leftward or rightward, as viewed in FIG. 2.

Figure 7:
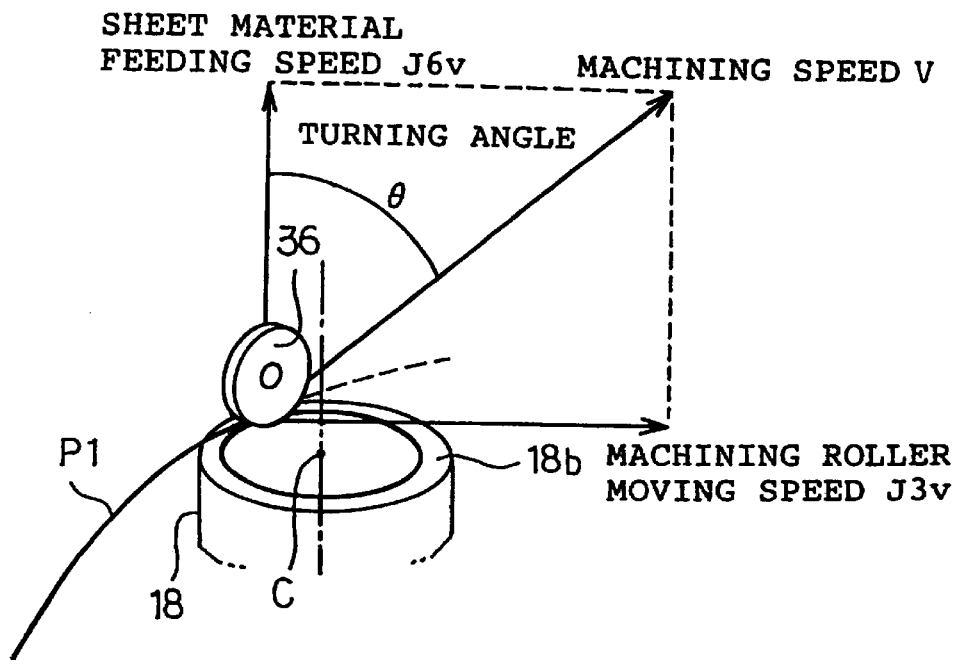
FIG. 7 schematically illustrates the machining operation of the ultrasonic welding/cutting machine.

In the above-described construction, the first and second moving members 20 and 37 are moved so that the machining roller 36 is placed on an upper end 18b of the cylindrical portion 18a of the tool horn 18, as shown in FIG. 7. As a result, the sheet material 7 can be held between the tool horn 18 and the machining roller 36. At this time, an axis of the turning shaft 40 of the machining roller 36 (and the support member 39) is adapted to be aligned with an axis of the tool horn 18, namely, the rotation center C (see FIG. 7). In other words, the machining roller 36 is turned on the axis C around the tool horn 18. The tool horn 18 and the machining roller 36 constitute an ultrasonic machining unit. Furthermore, the tool horn feeding motor 33 (or the roller moving means) and the machining roller feeding motor 52 (or the roller moving means) constitute unit moving means in the invention.

Figure 1:
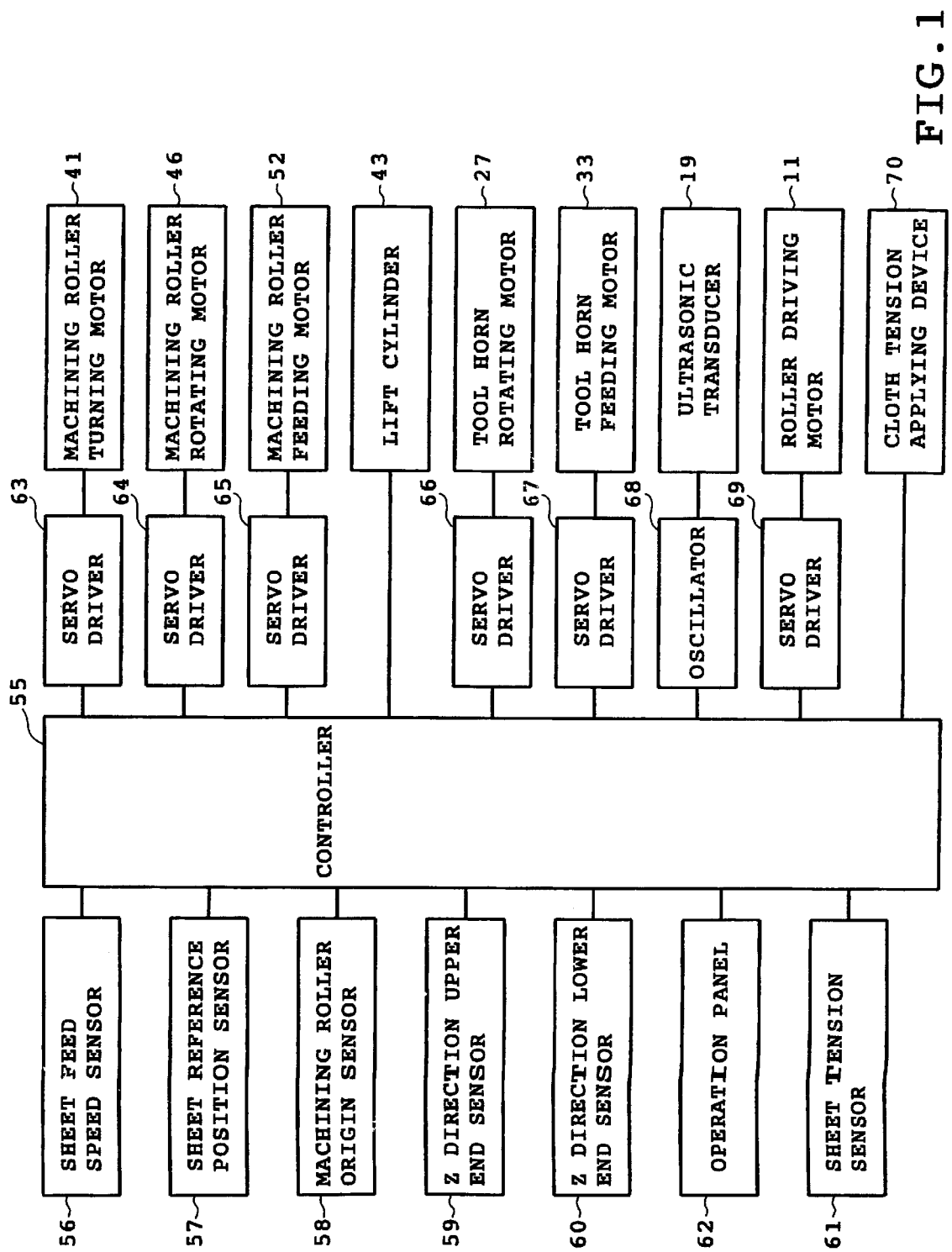
FIG. 1 is a block diagram showing the ultrasonic welding/cutting machine of a first embodiment in accordance with the present invention.

Referring now to FIG. 1 showing an electrical arrangement of the machine 1, a controller 55 is composed of microcomputer-based circuitry and has a function of controlling the entire operation of the ultrasonic welding/cutting machine 1 or incorporated with a control program for accomplishing the above function. The controller 55 thus constitutes control means in the invention.

The controller 55 is supplied with detection signals from a sheet feed speed sensor 56, a sheet reference position sensor 57, a machining roller origin sensor 58, a Z direction upper end sensor 59, a Z direction lower end sensor 60 and a sheet tension sensor 61. The sheet feed speed sensor 56 is disposed above the sheet material 7 placed on the roller 8 to detect the feed speed of the sheet material 7, as shown in FIG. 5. The sheet reference position sensor 57 is disposed at the side of a widthwise end of the sheet material 7 to detect a reference position of the sheet material 7, as shown in FIG. 6. The machining roller origin sensor 58 is disposed as shown in FIG. 6 to detect an origin of the machining roller 36. The Z direction upper end sensor 59 is disposed as shown in FIG. 5 to an upper dead point of the machining roller 36. The Z direction lower end sensor 60 is disposed as shown in FIG. 5 to detect a lower dead point of the machining roller 36. The sheet tension sensor 61 is disposed as shown in FIG. 6 to detect tension of the sheet material 7. Operation signals are also supplied from various switches provided on an operation panel 62 to the controller 55.

The controller 55 controls the machining roller turning motor 41, the machining roller rotating motor 46, the machining roller feeding motor 52 via respective servo drivers 63, 64 and 65 so that these motors are energized and deenergized. The controller 55 also controls the lift cylinder 43 so that the lift cylinder 43 is energized and deenergized. The controller 55 further controls the tool horn rotating motor 27 and the tool horn feeding motor 33 via respective servo drivers 66 and 67 so that these motors are energized and deenergized. The controller further actuates an oscillator 68 so that the ultrasonic transducer 19 is ultrasonically oscillated. The controller 55 further controls the roller driving motor 11 via a servo driver 69 so that the motor is energized and deenergized. The controller 55 further controls a sheet tension applying device 70 so that the device 70 is energized and deenergized.

The sheet tension applying device 70 is mounted on the shafts of the rolls 14 and 15 of the sheet material 7 to apply a desired tension to the sheet material 7. Each of the above-described motors is incorporated with a rotary encoder delivering a signal to the corresponding servo driver. As a result, the controller 55 controls a rotational speed (rotation angle) of each motor with high accuracy in a feedback manner.

The operation of the ultrasonic welding/cutting machine will be described with reference to FIGS. 7 to 12. The controller 55 sets a feed speed of the sheet material 7, a rotational speed of the tool horn 18, a moving speed of the tool horn 18, a moving speed of the machining roller 36, and a moving speed of the machining roller 36, based on a machining speed at which welding or cutting for the sheet material 7 progresses and a turning angle of the machining roller 36. The moving speed of the tool horn 18 is equal to the moving speed of the machining roller 36 during the machining and further to the moving speed of the ultrasonic welding/cutting unit.

The following equations (1) to (5) represent the feed speed J6 v of the sheet material 7, the rotational speed J4 v of the tool horn 18, the moving speed J5 v of the tool horn 18, the moving speed J1 v of the machining roller 36, and the moving speed J3 v of the machining roller 36 respectively:

$$J6\ v = v \times \cos\theta \quad (1)$$

$$J3\ v = v \times \sin\theta \quad (2)$$

$$J1\ v = v / D1 \times \pi \quad (3)$$

$$J5\ v = v \times \sin\theta \quad (4)$$

$$J4\ v = v / 2 \times R \times \pi \quad (5)$$

where v is a machining speed externally supplied to the controller 55, θ is a turning angle of the machining roller 36 externally supplied to the controller 55, D1 is an outer diameter of the machining roller 36, and R is a distance between the axis C of the tool horn 18 and a machining point which is on the upper end 18b of the tool horn 18 and with which the machining roller 36 comes into contact.

Upon receipt of the externally supplied machining speed v and the turning angle θ, the controller 55 executes operations by means of the equations (1) to (5) to thereby obtain the values of the feed speed J6 v of the sheet material 7, the rotational speed J4 v of the tool horn 18, the moving speed J5 v of the tool horn 18, the moving speed J1 v of the machining roller 36, and the moving speed J3 v of the machining roller 36 respectively. The controller 55 then energizes the machining roller turning motor 41 to turn the machining roller 36 so that the roller assumes the instructed turning angle θ.

Thereafter, the controller 55 energizes the roller driving motor 11, the tool horn rotating motor 27, the tool horn feeding motor 33, the machining roller rotating motor 46, and the machining roller feeding motor 52 so that the feed speed J6 v of the sheet material 7, the rotational speed J4 v of the tool horn 18, the moving speed J5 v of the tool horn 18, the moving speed J1 v of the machining roller 36, and the moving speed J3 v of the machining roller 36, all of which have been obtained by the above operations, are reached. The moving speed J5 v of the tool horn 18 is the same as the moving speed J3 v of the machining roller 36. The tool horn 18 and the machining roller 36 are moved at the same speed in the same direction.

A machining curve P1 or machining locus such as shown in FIG. 7 as a post-machining shape is formed on the sheet material 7 when the ultrasonic welding/cutting machine 1 is controlled as described above. When the welding is executed by the ultrasonic welding/cutting machine 1, for example, the above-mentioned machining curve P1 is a welding curve or welding locus.

Although the machining speed v and the turning angle θ are externally supplied to the controller 55 in the above-described control manner, a post-machining shape or machining locus may externally be supplied to the controller 55, instead. In this case, the controller 55 obtains and sets the machining speed v and the turning angle θ by operations.

Based on the obtained machining speed v and turning angle θ, the controller 55 obtains and sets, by operations, the values of the feed speed J6 v of the sheet material 7, the rotational speed J4 v of the tool horn 18, the moving speed J5 v of the tool horn 18, the moving speed J1 v of the machining roller 36, and the moving speed J3 v of the machining roller 36. Data of these values corresponds to a control data. Thus, the controller 55 constitutes operating means in the invention.

In order that the post-machining shape or machining locus may externally be supplied to the controller 55, machining data specifying the post-machining shape may be supplied to the controller 55, for example. The machining data includes vector data indicative of the machining locus or an equation for obtaining the machining locus. The machining data is preferably originated using a personal computer and CAD. The personal computer and CAD thus constitute plotting means in the invention. Data of DXF format is preferred as the data of post-machining shape originated by the CAD of the personal computer, for example. The data of post-machining shape of the DXF format can readily be supplied into the controller 55 to be converted to the control data.

Furthermore, a personal computer may be connected to the controller 55 so that the data of post-machining shape is originated by the personal computer and CAD. In this case, a simplified CAD is preferred. Additionally, the data of post-machining shape may be originated by the personal computer, and the control data may be obtained by operations on the basis of the originated post-machining shape data in the personal computer. In this case, the personal computer or the personal computer, CAD and a program for obtaining the control data by operations constitute plotting means and operation means in the invention. In this arrangement, the controller 55 controls the various drive means of the ultrasonic welding/cutting machine according to the control data obtained by the personal computer.

Figure 8:
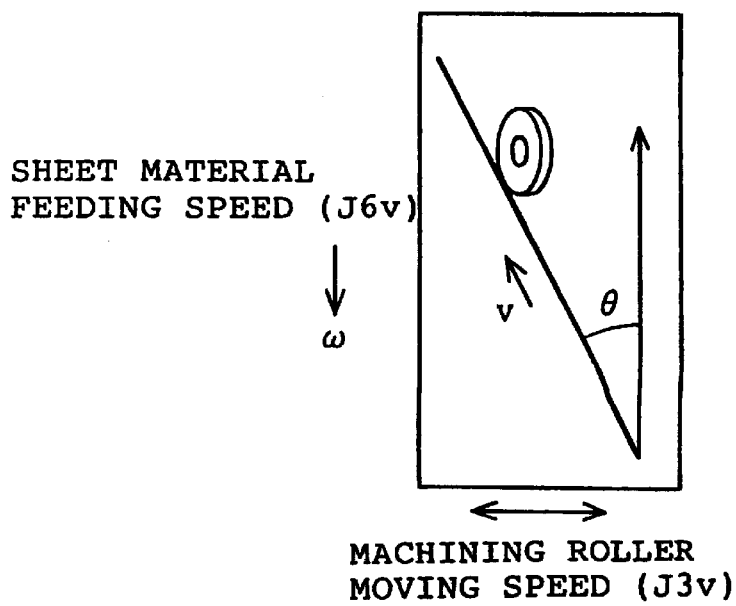
FIG. 8 illustrates an example of the post-machining shape of the sheet material.

When various machining shapes are supplied to the ultrasonic welding/cutting machine 1, the controller 55 also obtains the values of the machining speed v, the turning angle θ, the feed speed J6 v of the sheet material 7, the rotational speed J4 v of the tool horn 18, the moving speed J5 v of the tool horn 18, the moving speed J1 v of the machining roller 36, and the moving speed J3 v of the machining roller 36. This control manner will now be described. Referring to FIG. 8 showing example 1, a case is shown where a machining straight line at an angle θ1 to the direction in which the sheet material 7 is fed is obtained as the post-machining shape. The controller 55 obtains the above-described speeds and the turn angle of the machining roller 36 from respective following equations:

$$J3 = \omega \times t \times \tan\theta_1 \tag{6}$$

$$J3\ v = \omega \times \tan\theta_1 \tag{7}$$

$$J6\ v = \omega \tag{8}$$

$$v = \sqrt{(J3\ v)^2 + \omega^2} \tag{9}$$

$$J1\ v = v/D1/\pi \tag{10}$$

Accordingly, the rotational speed J1 v of the machining roller 36 is represented by the following equation (11):

$$J1\ v = \sqrt{(J3\ v)^2 + \omega^2}/D1/\pi \tag{12}$$

$$\theta = \arctan(J3\ v/\omega) \times 360/2/\pi \tag{13}$$

where J3 is the movement location of the machining roller 36 and is represented in mm, J3 v, J6 v and v are represented in mm/sec., J2 v is represented in 1/sec., and θ is represented in degree.

Figure 9:
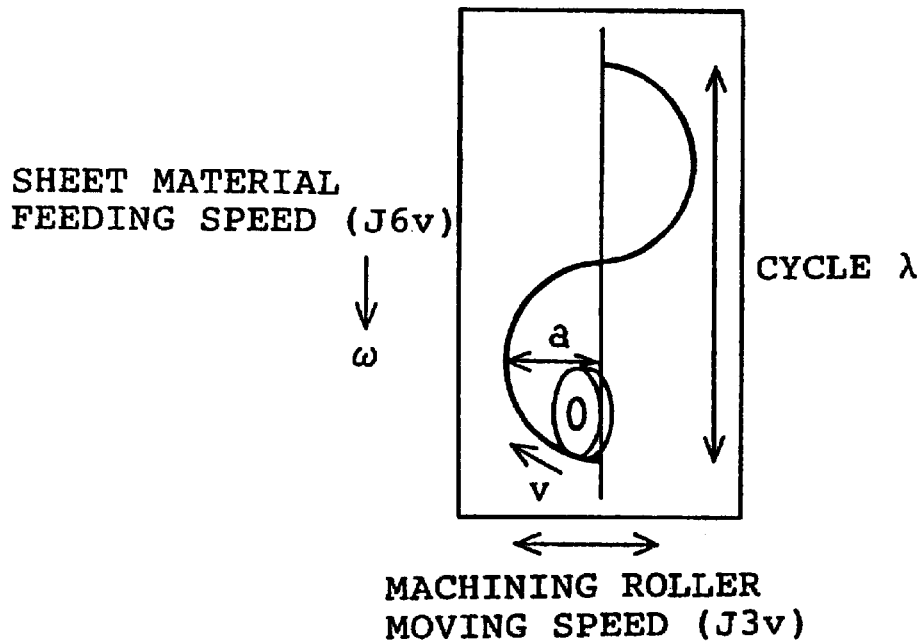
FIG. 9 illustrates another example of the post-machining shape of the sheet material.

FIG. 9 shows example 2 in which the machining curve is obtained represented by the following equation (14):

$$y = a \times \sin(2\pi\omega t/\lambda) \tag{14}$$

where the x(ωt)-axis is the same direction that the sheet material 7 is fed, the y-axis is the direction generally perpendicular to the direction in which the sheet material 7 is fed, a is the amplitude of the machining curve in mm, λ is the cycle in mm, ω(mm/sec.) is the feed speed J6 v of the sheet material 7, and t is time (sec.). In this case, the controller 55 obtains the speeds and the turning angle θ of the machining roller 36 from the following equations (15) to (19):

$$J3 = a \times \sin(2\pi\omega t/\lambda) \tag{15}$$

$$J3\ v = a \times 2\pi\omega/\lambda \times \cos(2\pi\omega t/\lambda) \tag{16}$$

$$J6\ v = \omega \tag{17}$$

$$v = \sqrt{(J3\ v)^2 + \omega^2} \tag{18}$$

$$J1\ v = v/D1/\pi \tag{19}$$

where the units and other conditions are the same as those in the foregoing example 1. Accordingly, the rotational speed J1 v of the machining roller 36 is represented by the following equation (20):

$$J1\ v = \sqrt{(J3\ v)^2 + \omega^2}/D1/\pi \tag{20}$$

$$\theta = \arctan(J3\ v/\omega) \times 360/2/\pi \tag{21}$$

Figure 10:
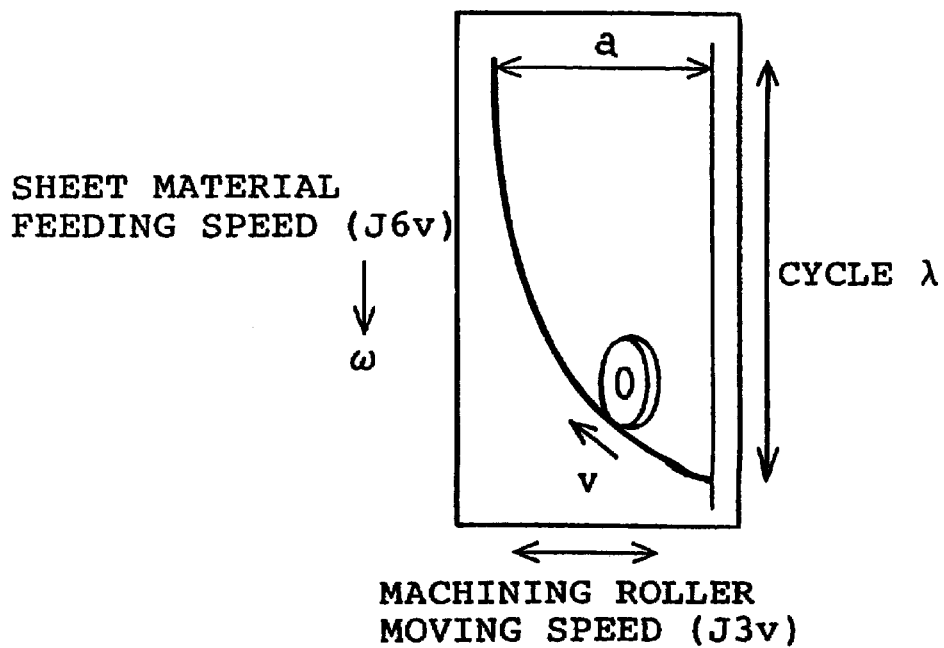
FIG. 10 illustrates further another example of the post-machining shape of the sheet material.

Furthermore, in example 3 shown in FIG. 10, the machining curve obtained as the post-machining shape is represented by the following equation (22):

$$y = a \times \sqrt{\omega t/\lambda} \tag{22}$$

where the x(ωt)-axis is the same direction that the sheet material 7 is fed, the y-axis is the direction crossing the direction in which the sheet material 7 is fed, a is the amplitude of the machining curve in mm, λ is the cycle in mm, ω(mm/sec.) is the feed speed J6 v of the sheet material 7, and t is time (sec.). In this case, the controller 55 obtains the speeds and the turning angle θ of the machining roller 36 from the following equations (23) to (27):

$$J3 = a \times \sqrt{\omega t/\lambda} \tag{23}$$

$$J3\ v = a \times \omega/\lambda/(2 \times \sqrt{\omega t/\lambda}) \tag{24}$$

$$J6\ v = \omega \tag{25}$$

$$v = \sqrt{(J3\ v)^2 + \omega^2} \tag{26}$$

$$J1\ v = v/D1/\pi \tag{27}$$

where the units and other conditions are the same as those in the foregoing example 1. Accordingly, the rotational speed J1 v of the machining roller 36 is represented by the following equation (28):

$$J1\ v = \sqrt{(J3\ v)^2 + \omega^2}/D1/\pi \tag{28}$$

$$= \arctan(J3\ v/\omega) \times 360/2/\pi \tag{29}$$

Figure 11:
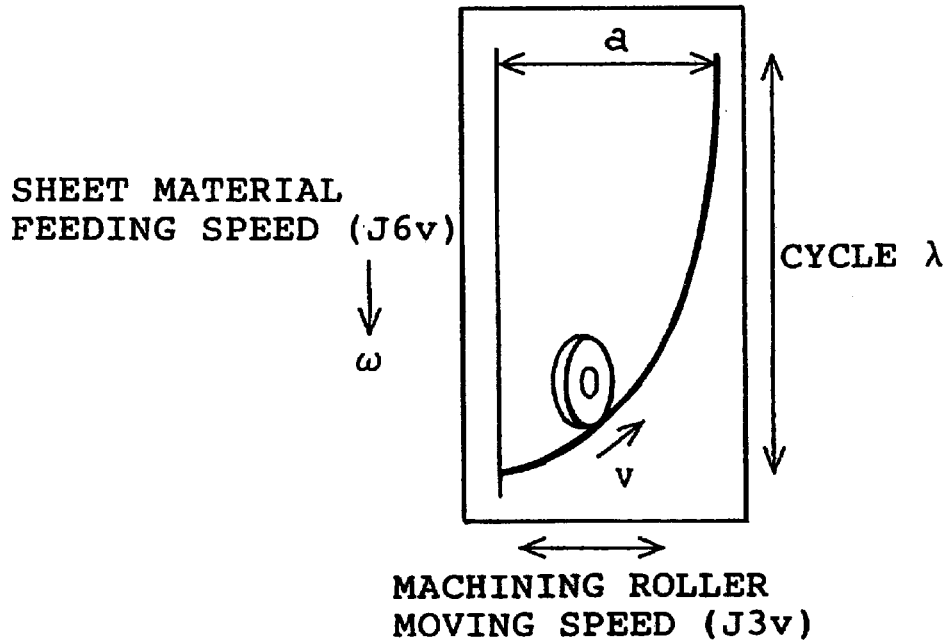
FIG. 11 illustrates still further another example of the post-machining shape of the sheet material.

Furthermore, in example 4 shown in FIG. 11, the machining curve obtained as the post-machining shape is represented by the following equation (30):

$$y = a \times \exp(-\omega t/\lambda) \tag{30}$$

where the x(ωt)-axis is the same direction that the sheet material 7 is fed, the y-axis is the direction generally perpendicular to the direction in which the sheet material 7 is fed, a is the amplitude of the machining curve in mm, λ is the cycle in mm, ω(mm/sec.) is the feed speed J6 v of the sheet material 7, and t is time (sec.). In this case, the controller 55 obtains the speeds and the turning angle θ of the machining roller 36 from the following equations (31) to (35):

$$J3 = a \times \exp(-\omega t/\lambda) \tag{31}$$

$$J3\ v = -a \times (\omega/\lambda) \times \exp(-\omega t/\lambda) \tag{32}$$

$$J6\ v = \omega \tag{33}$$

$$v = \sqrt{(J3\ v)^2 + \omega^2} \tag{34}$$

$$J1\ v/D1/\pi \tag{35}$$

where the units and other conditions are the same as those in the foregoing example 1. Accordingly, the rotational speed J1 v of the machining roller 36 is represented by the following equation (36):

$$J1\ v = \sqrt{(J3\ v)^2 + \omega^2}/D1/\pi \quad (36)$$

$$\theta = \arctan(J3\ v/\omega) \times 360/2/\pi \quad (37)$$

Figure 12:
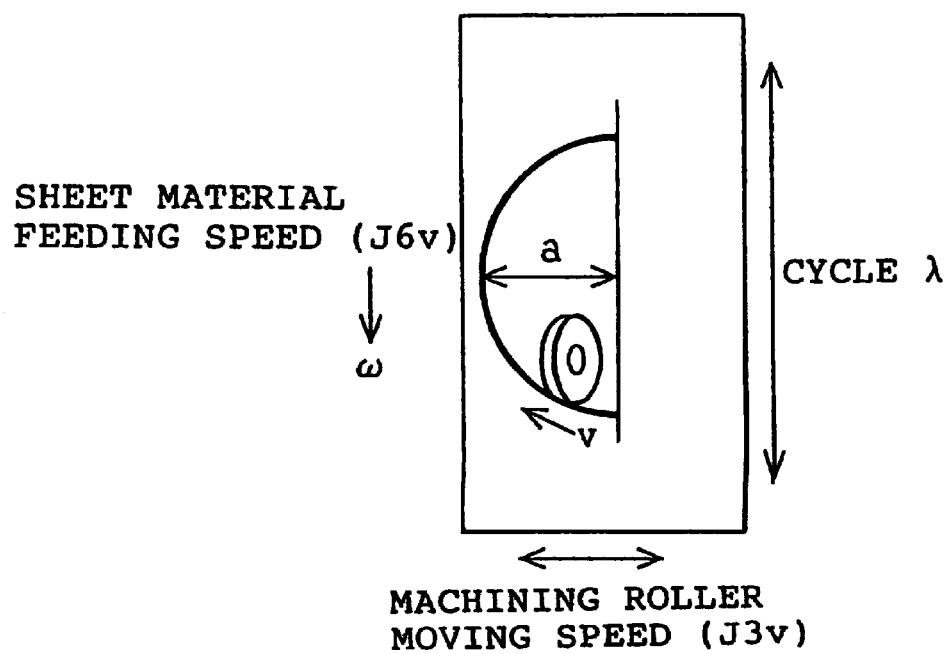
FIG. 12 illustrates yet further another example of the post-machining shape of the sheet material.

Furthermore, in example 5 shown in FIG. 12, the machining curve obtained as the post-machining shape is represented by the following equation (38):

$$y = \sqrt{a^2 - (\omega t/\lambda)^2} \quad (38)$$

where the x($\omega$t)-axis is the same direction that the sheet material 7 is fed, the y-axis is the direction generally perpendicular to the direction in which the sheet material 7 is fed, a is the amplitude of the machining curve in mm, $\lambda$ is the cycle in mm, $\omega$(mm/sec.) is the feed speed J6 v of the sheet material 7, and t is time (sec.). In this case, the controller 55 obtains the speeds and the turning angle $\theta$ of the machining roller 36 from the following equations (39) to (43):

$$J3 = \sqrt{a^2 - (\omega t/\lambda)^2} \quad (39)$$

$$J3\ v = 2\omega(\omega t - \lambda/2)/\sqrt{(\lambda/2)^2 - (\omega t - \lambda/2)^2} \quad (40)$$

$$J6\ v = \omega \quad (41)$$

$$v = \sqrt{(J3\ v)^2 + \omega^2} \quad (42)$$

$$J1\ v = v/D1/\pi \quad (43)$$

where the units and other conditions are the same as those in the foregoing example 1. Accordingly, the rotational speed J1 v of the machining roller 36 is represented by the following equation (44):

$$J1\ v = \sqrt{(J3\ v)^2 + \omega^2}/D1/\pi \quad (44)$$

$$\theta = \arctan(J3\ v/\omega) \times 360/2/\pi \quad (45)$$

According to the foregoing embodiment, the various drive motors 11, 27, 33, 41, 46, and 52 are controlled by the controller 55 so that the machining roller 36 and the tool horn 18 (or the ultrasonic machining unit) are reciprocally moved in the direction generally perpendicular to the direction in which the sheet material 7 is fed, while the sheet material 7 is being fed. In this construction, the feed speed J6 v of the sheet material 7, the moving speeds J3 v and J5 v of the machining roller 36 and the tool horn 18 (J3 v=J5 v), the moving directions of the machining roller 36 and the tool horn 18, etc. are adjusted so that the machining straight line oblique to the direction in which the sheet material 7 is fed and a desired machining curve can readily be obtained as the post-machining shape of the sheet material 7.

Particularly in the embodiment, the machining roller 36 is turnable on the axis C of the tool horn 18 around the tool horn 18. Accordingly, the machining roller 36 is turned around the tool horn 18 when the machining roller 36 and the tool horn 18 are moved while the sheet material 7 is being fed. Consequently, since the sheet material 7 is prevented from occurrence of crease etc., the quality of the machined sheet material 7 can be improved.

The controller sets the feed speed J6 v of the sheet material 7, the rotational speed J4 v of the tool horn 18, the moving speed J5 v of the tool horn 18, the rotational speed J1 v of the machining roller 36, and the moving speed J3 v of the machining roller 36, based on the machining speed v at which welding or cutting for the sheet material 7 progresses and a turning angle $\theta$ of the machining roller 36. Thus, a desired post-machining shape can be obtained when only the machining speed v and the turning angle $\theta$ are externally supplied to the controller 55. Consequently, the operability of the ultrasonic welding/cutting machine or the controller 55 can be improved.

The controller 55 sets the machining speed v and the turning angle $\theta$ of the machining roller 36 based on the post-machining shape or machining data set to the controller 55. In this arrangement, the machining speed v and the turning angle $\theta$ can be determined when only the post-machining shape is externally supplied to the controller 55. Based on the determined machining speed v and turning angle $\theta$, the controller 55 can further determine the feed speed J6 v of the sheet material 7, the rotational speed J4 v of the tool horn 18, the moving speed J5 v of the tool horn 18, the rotational speed J1 v of the machining roller 36, and the moving speed J3 v of the machining roller 36. Thus, a desired post-machining shape can be obtained only when the machining shape is externally supplied to the controller 55. Consequently, the operability of the ultrasonic welding/cutting machine or the controller 55 can further be improved.

Figure 13:
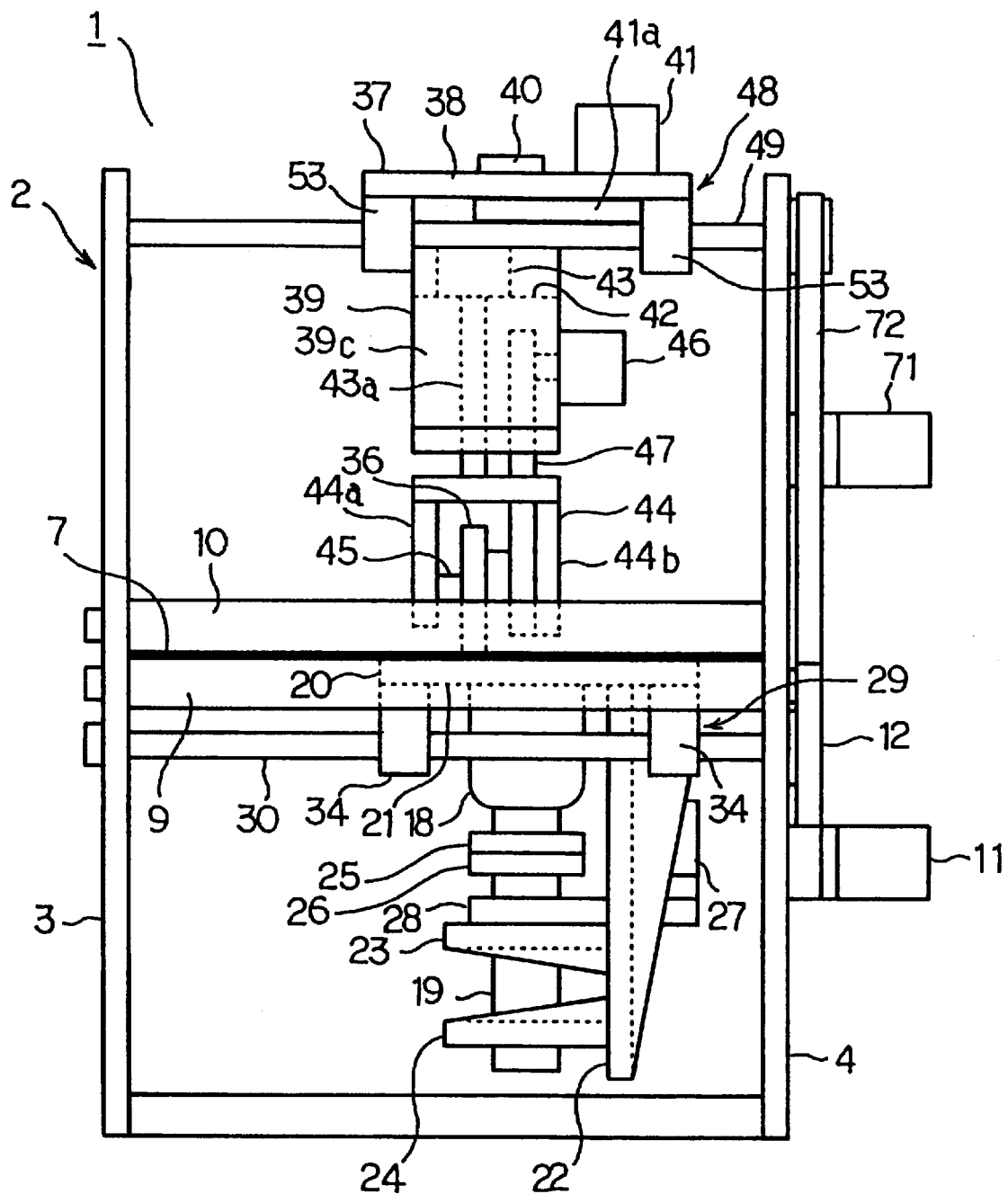
FIG. 13 is a view similar to FIG. 2, showing the ultrasonic welding/cutting machine of a second embodiment in accordance with the present invention.
Figure 14:
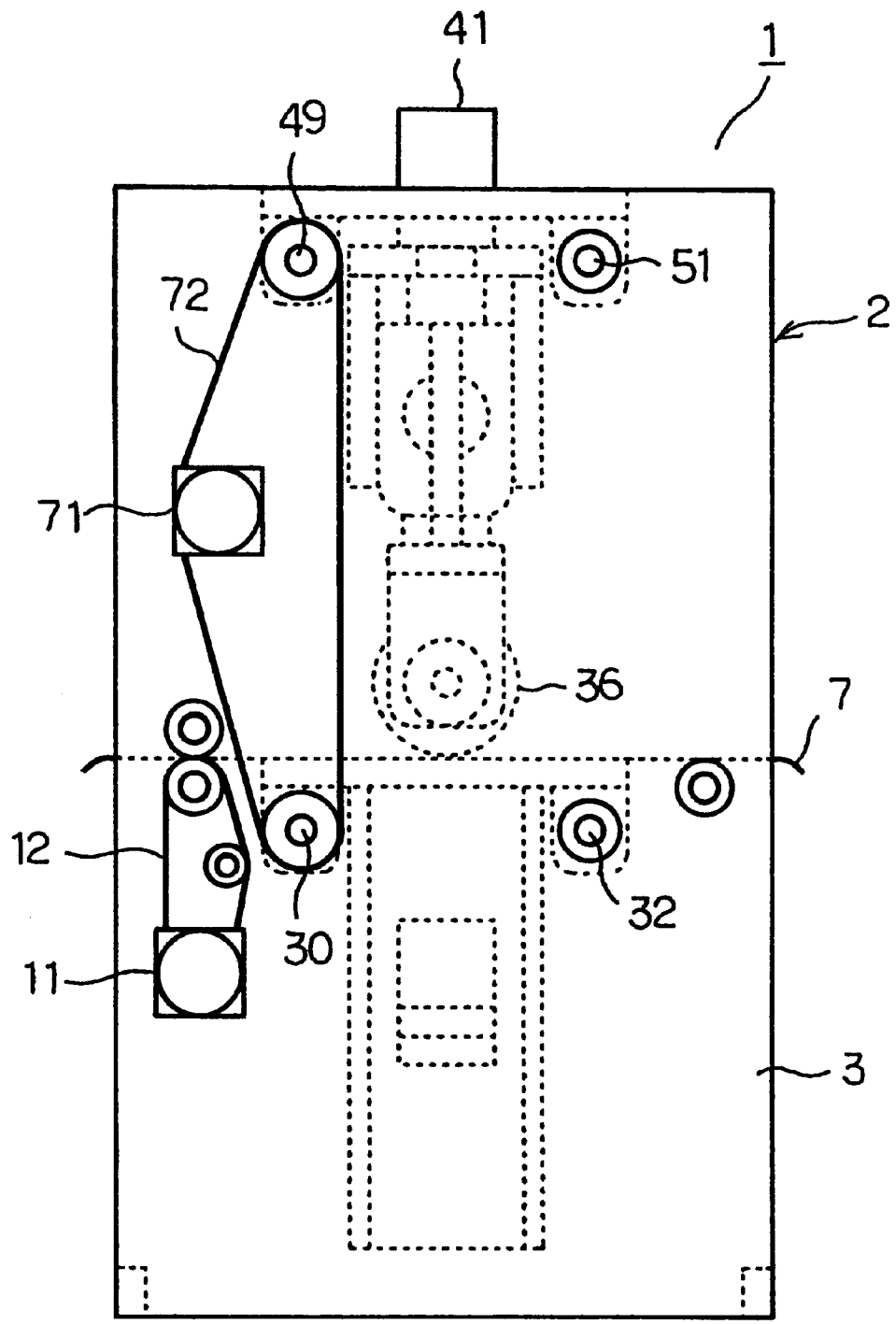
FIG. 14 is a right-hand side view of the machine.

FIGS. 13 and 14 illustrate a second embodiment of the invention. The differences between the first and second embodiments will be described. In the second embodiment, the identical parts are labeled by the same reference symbols as in the first embodiment. A single feeding motor 71 is provided for moving both tool horn 18 and machining roller 36 in the second embodiment. The feeding motor 71 has functions of the horn moving mechanism and the roller moving mechanism, namely, the function of the unit moving means.

More specifically, the above-mentioned single motor 71 is mounted on the right-hand side of the right-hand side plate 4 of the body frame 2, instead of the horn feeding motor 33 and the machining roller feeding motor 52, as shown in FIGS. 13 and 14. The feeding motor 71 comprises an AC servo motor, for example, and is controlled via the servo driver by the controller 55 so that the motor 71 is energized and deenergized. A rotating force developed by the feeding motor 71 is transmitted via a belt transmission mechanism 72 to the threaded rod 30 at the tool horn 18 side and the threaded rod 49 at the machining roller 36 side.

The belt transmission mechanism 72 comprises a driving pulley mounted on a rotational shaft of the feeding motor 71, a driven pulley mounted on the threaded rod 30, a driven pulley mounted on the threaded rod 49, and transmission belts connecting between the driving pulley and the respective driven pulleys. In this construction, the feeding motor 71 rotates the threaded rod 30 at the tool horn 18 side and the threaded rod 49 at the machining roller 36 side at the same rotational speed in the same direction. Consequently, the first and second moving members 20 and 37 and accordingly, the tool horn 18 and the machining roller 36 are moved by the single motor 71.

In the second embodiment, the construction other than described above is the same as that in the first embodiment. Accordingly, the same effect can be achieved in the second embodiment as in the first embodiment. Particularly in the second embodiment, since both of the tool horn 18 and the machining roller 36 are moved by the single motor 71, the number of motors used in the machine can be reduced and the controlling arrangement of the controller 55 can be simplified.

Figure 15:
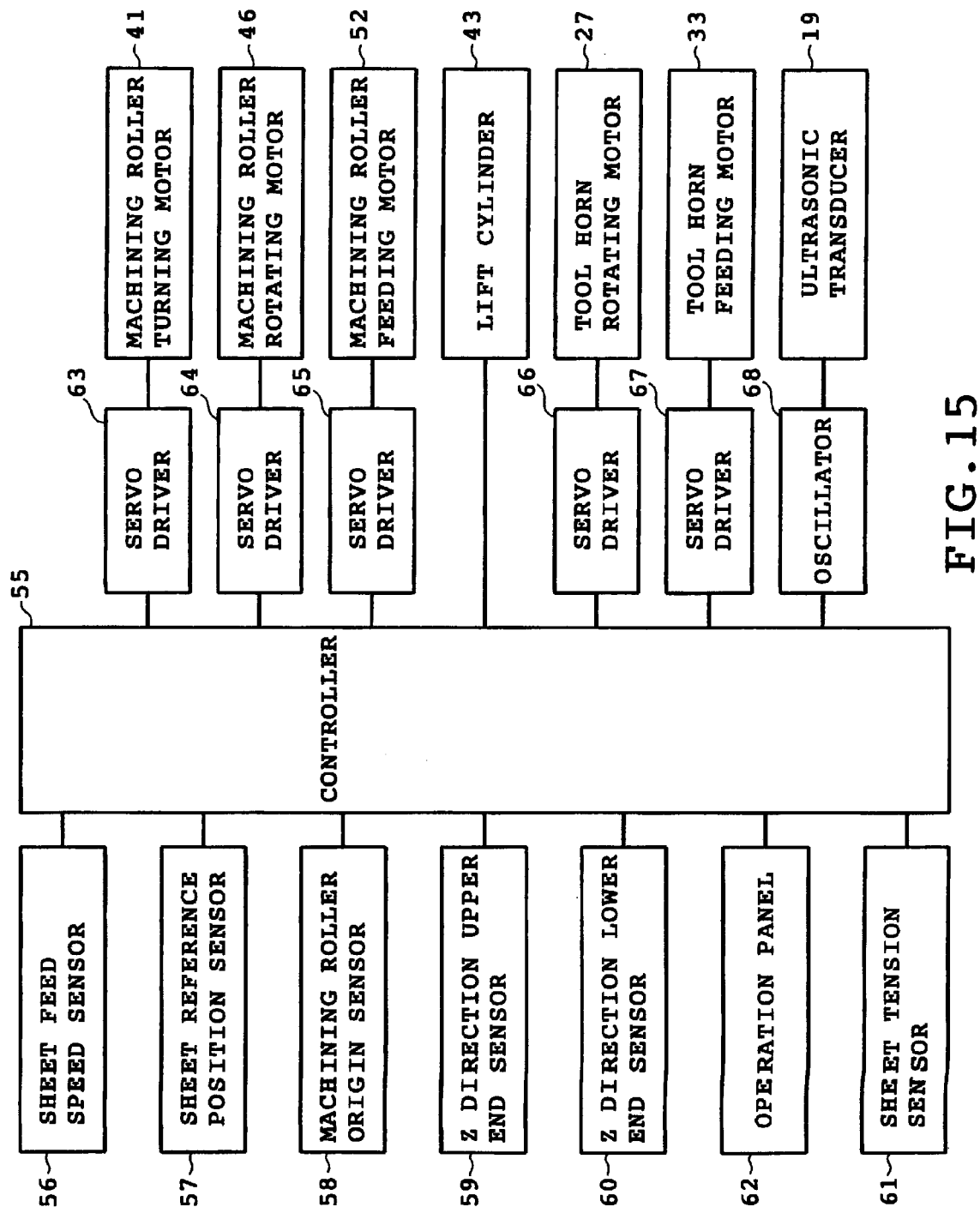
FIG. 15 is a view similar to FIG. 1, showing the ultrasonic welding/cutting machine of a third embodiment in accordance with the present invention.

FIG. 15 illustrates a third embodiment of the invention. The differences between the first and third embodiments will be described. In the third embodiment, the identical parts are labeled by the same reference symbols as in the first embodiment. The roller driving motor 11, the servo driver 69 and the sheet tension applying device 70 are eliminated in the third embodiment. Feeding the sheet material 7 and applying tension to the sheet material 7 are executed and controlled at the side of the sheet material feeder 13.

In the third embodiment, the controller 55 obtains by operations and sets the rotational speed J4 v of the tool horn 18, the moving speed J5 v of the tool horn 18, the rotational speed J1 v of the machining roller 36, the moving speed J3 v of the machining roller 36, and the turning angle θ of the machining roller 36, based on the feed speed v detected by the sheet feed speed sensor 56 serving feed speed detecting means and the machining shape or machining data set thereto. In this arrangement, the equations used for obtaining the speeds and the angle θ in the first embodiment are also used in the third embodiment. The construction of the third embodiment other than described above is the same as that in the first embodiment. Accordingly, the same effect can be achieved in the third embodiment as in the first embodiment. Particularly in the third embodiment, since the ultrasonic welding/cutting machine 1 is not provided with the roller driving motor 11, the servo driver 69 and the sheet tension applying device 70, the construction of the machine 1 can be simplified and accordingly, the manufacturing cost can be reduced.

The feeding of the sheet material 7 and the application of tension to the sheet material 7 are executed and controlled at the side of the sheet material feeder 13 in the third embodiment. However, a sheet material discharger may be provided at a sheet material discharge side of the machine 1 so that the feeding of the sheet material 7 is performed by the sheet material discharger.

The feed speed v of the sheet material 7 is detected by the sheet feed speed sensor 56 in the third embodiment. The sheet feed speed of the sheet material 7 may externally be supplied to the controller 55, instead. In this arrangement, too, the controller 55 can obtain by operations and set the rotational speed J4 v of the tool horn 18, the moving speed J5 v of the tool horn 18, the rotational speed J1 v of the machining roller 36, the moving speed J3 v of the machining roller 36, and the turning angle θ of the machining roller 36, based on the feed speed v and machining shape both externally supplied to the controller 55. Since the sheet feed speed sensor 56 is eliminated, the manufacturing cost can further be reduced.

Figure 16:
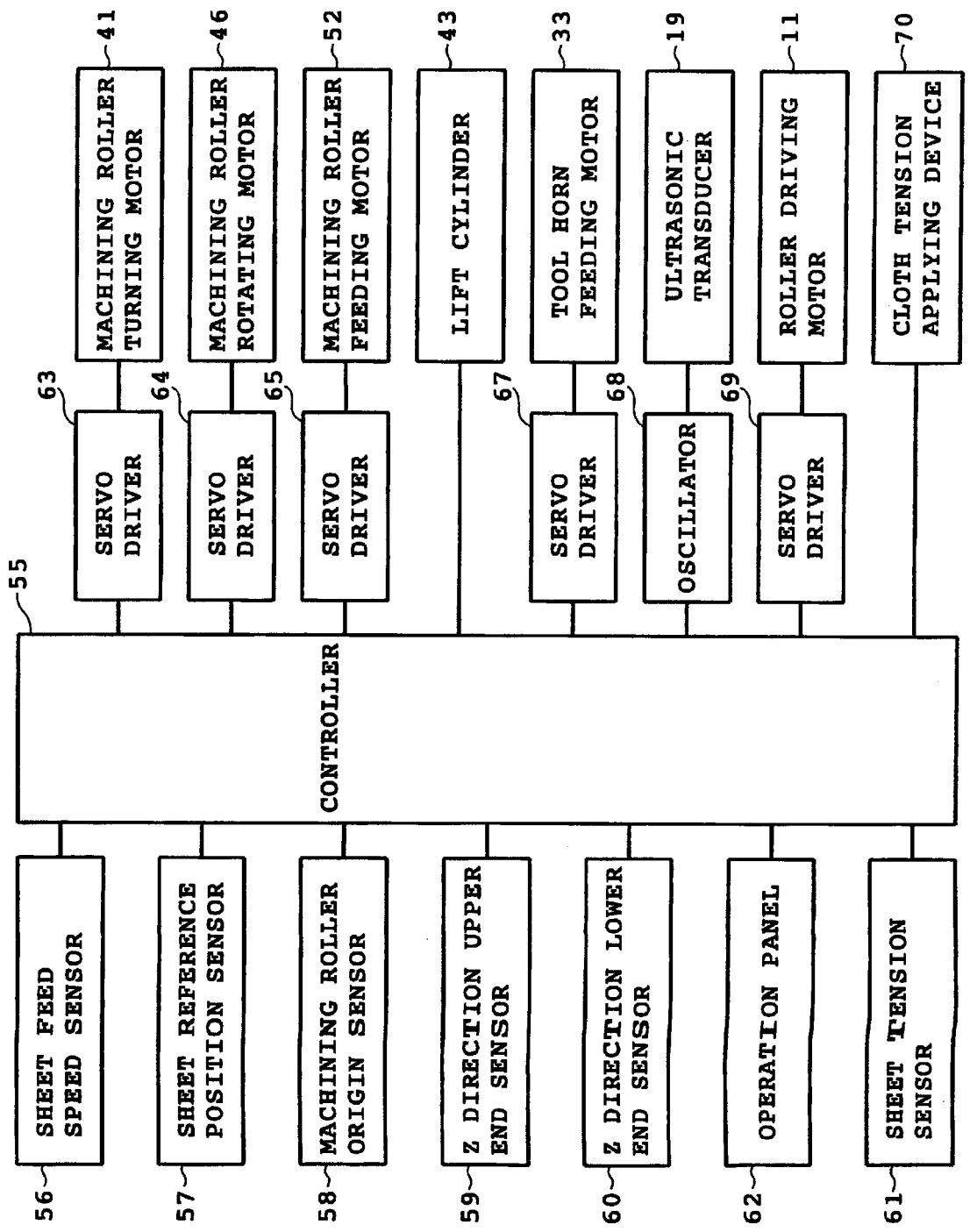
FIG. 16 is a view similar to FIG. 1, showing the ultrasonic welding/cutting machine of a fourth embodiment in accordance with the present invention.
Figure 17:
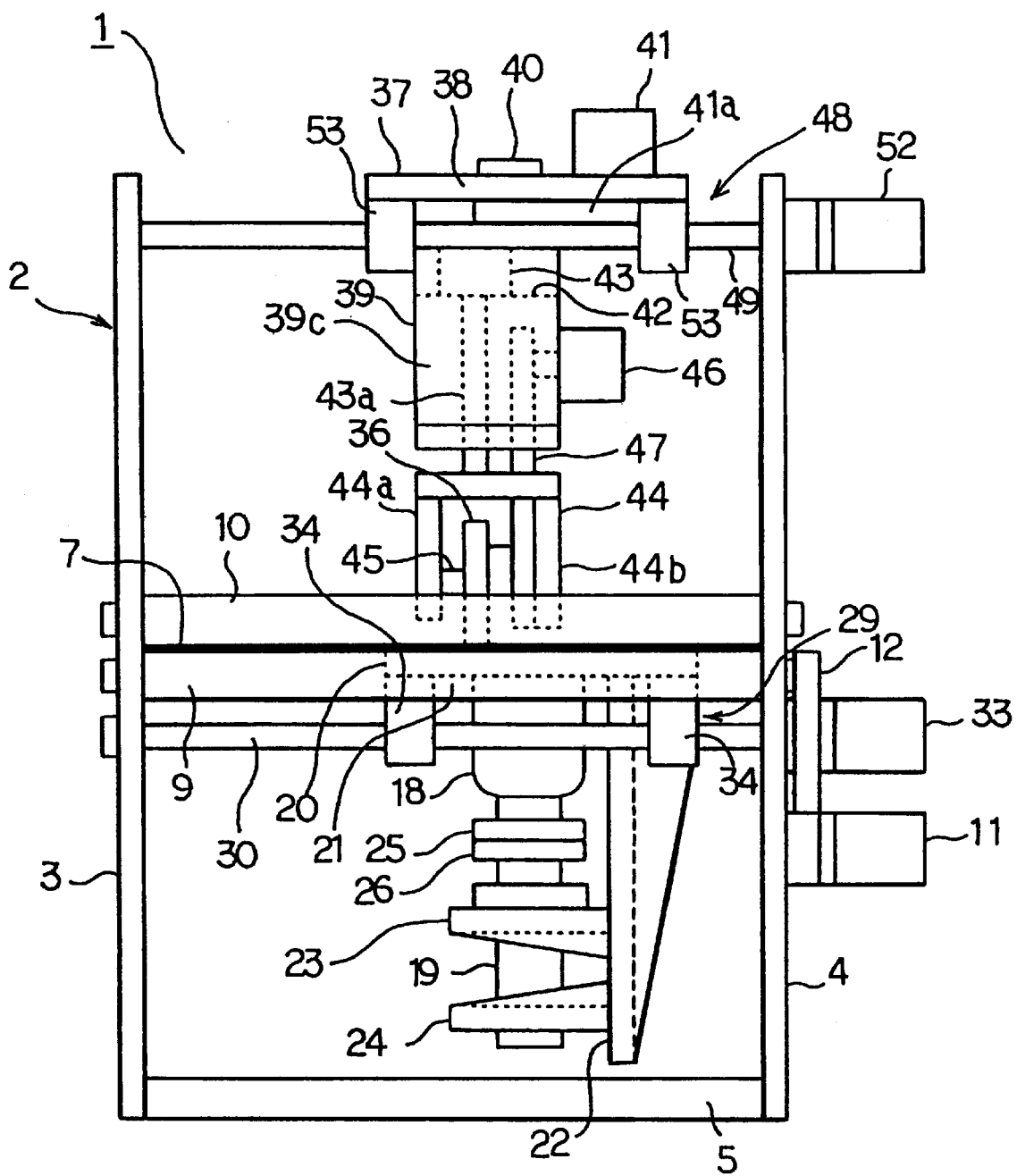
FIG. 17 is a view similar to FIG. 2, showing the fourth embodiment.
Figure 18:
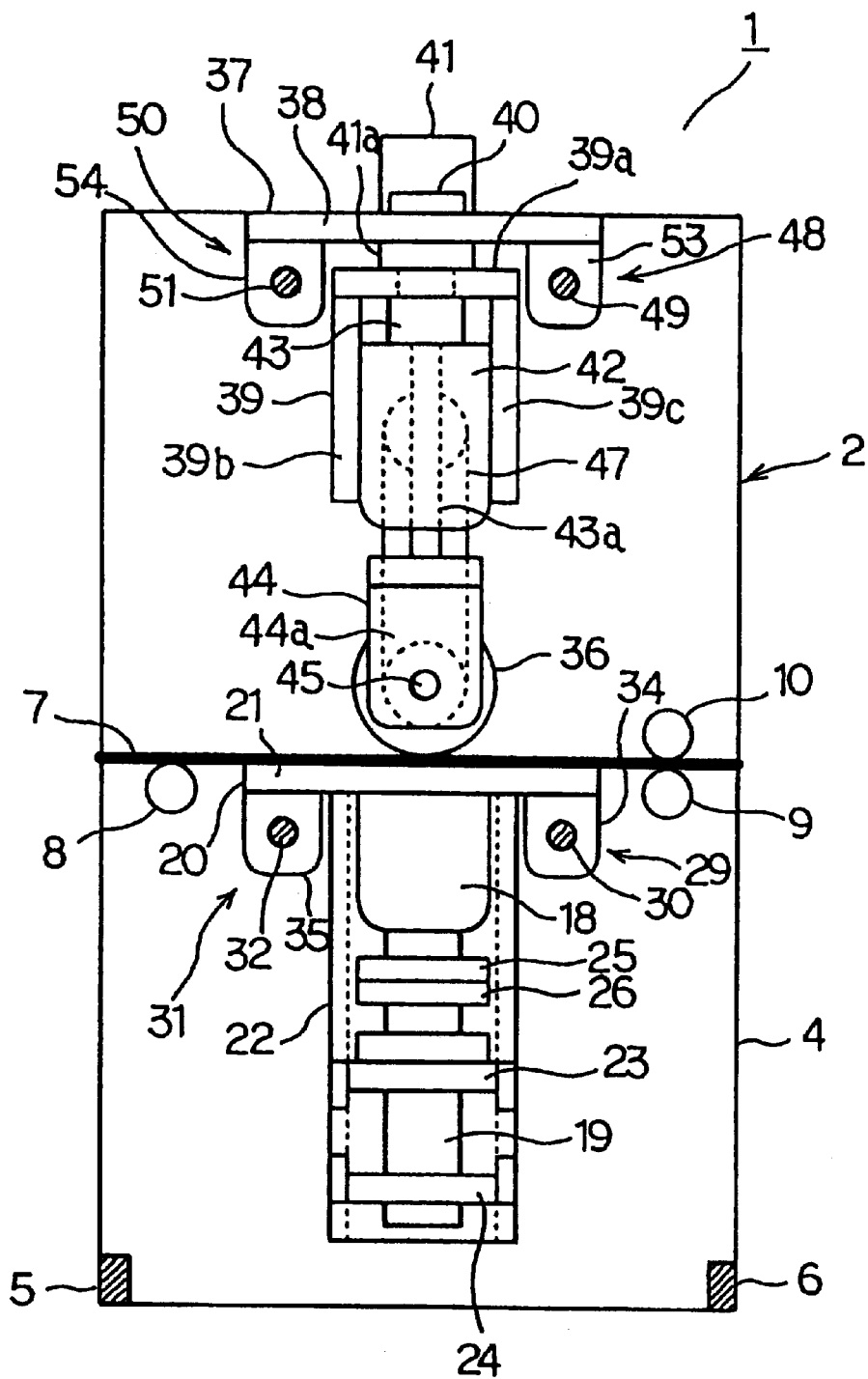
FIG. 18 is a view similar to FIG. 3, showing the fourth embodiment.

FIGS. 16 to 18 illustrate a fourth embodiment. The differences between the first and fourth embodiments will be described. In the fourth embodiment, the identical parts are labeled by the same reference symbols as in the first embodiment. The tool horn rotating motor 27, the servo driver 66 and the belt transmission mechanism 28 are eliminated in the fourth embodiment, as shown in FIGS. 16 to 18. The construction of the fourth embodiment other than described above is the same as that in the first embodiment. Accordingly, the same effect can be achieved in the fourth embodiment as in the first embodiment. Particularly in the fourth embodiment, since the tool horn rotating motor 27, the servo driver 66 and the belt transmission mechanism 28 are eliminated, the number of motors used in the machine 1 can be reduced and the controlling arrangement of the controller 55 can be simplified.

The construction in which the tool horn 18 is not rotated as in the fourth embodiment is suitable for welding or cutting plastic films or unwoven fabrics. On the other hand, it is desirable that the tool horn 18 should be rotated when glass fiber films or unwoven fabrics are welded or cut by the machine 1 as in the first to third embodiments. Furthermore, the tool horn 18 should be rotated when relatively thick plastic films or unwoven fabrics are welded or cut. In the last case, the tool horn 18 would be damaged or worn out if it is not rotated. Accordingly, the tool horn 18 can be prevented from being damaged or worn out when rotated.

In view of the above-described circumstances, the ultrasonic welding/cutting machine according to the fourth embodiment may be designed so that the construction for rotating the tool horn 18, namely, the tool horn rotating motor 27, the servo driver 66 and the belt transmission mechanism 28 can be added to the machine in compliance with the users' demand after the machine has been sold.

The machining roller 36 is turned around the tool horn 18 on the axis C of the latter in the fourth embodiment. However, the machining roller 36 is not necessarily be turned on the axis C of the tool horn 18 when the tool horn 18 is not rotated. The machining roller 36 may be turned on a suitable point on the tool horn 18.

The tool horn 18 may or may not be rotated in the second and third embodiments. When the tool horn 18 is not rotated in these embodiments, the machining roller 36 may be turned either on the axis C or a suitable point on the tool horn 18. Furthermore, the tool horn 18 is formed into the cylindrical shape in each of the foregoing embodiments. However, the tool horn 18 may be columnar or polygonally cylindrical, instead. Moreover, the tool horn 18 may be formed into the shape of a disk, rectangular plate or polygonal plate.

In the foregoing embodiments, a ROM (not shown) is provided in the controller 55 for storing a program for accomplishing the control means or a program for operating the ultrasonic welding/cutting machine 1. However, the program may be stored in an external ROM card so that the controller 55 is operated on the basis of the program stored in the external ROM card. Furthermore, an EEPROM may be provided in the controller 55. In this case, the program stored in the external ROM card is transferred to the EEPROM and thereafter, the controller 55 is operated on the basis of the program stored in the EEPROM. Furthermore, a hard disk system and a floppy disk drive system may be provided in the controller 55 so that the program is stored in the hard drive system. In this case, the program may be stored in a floppy disk so that the program is installed in the hard disk system of the controller 55 when the floppy disk is inserted into the floppy disk drive system. Furthermore, the program may be stored in a CD-ROM and a CD-ROM drive system may be provided in the controller 55 so that the program is installed via the CD-ROM into the controller 55. A storage medium for storing the program should not be limited to the above-described external ROM card, floppy disk and CD-ROM. Other storage media may be used. Additionally, a personal computer may be connected to the controller 55 or may constitute the controller 55. In each case, the program stored in each of the above-described storage media can readily be installed in the personal computer or replaced with the program in the personal computer.

A single ultrasonic machining unit including the tool horn 18 and the machining roller 36 is provided in the machine 1 in each of the foregoing embodiments. However, a plurality of such ultrasonic machining units may be provided in the machine 1, instead. More specifically, two or more ultrasonic machining units are disposed to be spaced from each other or one another in the direction of feed of the sheet material 7 and each to be reciprocally moved in the direction crossing the direction of feed of the sheet material 7. Consequently, a closed loop machining shape such as a circular, elliptic or rhombic shape can readily be obtained without reverse feed of the sheet material 7. Intervals between the ultrasonic machining units may be changeable. Additionally, a plurality of ultrasonic machining units may be disposed in the direction crossing the direction of feed of the sheet material 7 and moved in the former direction.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

I claim:

1. An ultrasonic welding/cutting machine comprising:
   an ultrasonic machining unit including a machining roller and a tool horn to which ultrasonic waves are transmitted, the ultrasonic machining unit welding or cutting a sheet material by feeding the sheet material between the machining roller and the tool horn;
   unit moving means for moving the ultrasonic machining unit in a direction generally perpendicular to a direction in which the sheet material is fed;
   roller rotating means for rotating the machining roller on a first axis thereof; and
   roller turning means for turning the machining roller on a second axis perpendicular to said first axis.

2. An ultrasonic welding/cutting machine of claim 1, wherein the unit moving means includes horn moving means for reciprocally moving the tool horn in the direction generally perpendicular to the direction in which the sheet material is fed, and roller moving means for reciprocally moving the machining roller in the same direction that the tool horn is reciprocally moved.

3. An ultrasonic welding/cutting machine of claim 2, further comprising sheet feeding means for feeding the sheet material and control means for controlling the sheet feeding means, the horn moving means, the roller rotating means, the roller moving means and the roller turning means.

4. An ultrasonic welding/cutting machine of claim 3, wherein the control means sets a feed speed of the sheet material, a moving speed of the tool horn, a rotational speed of the machining roller, and a moving speed of the of the machining roller on the basis of a machining speed at which welding or cutting for the sheet material progresses and a turning angle of the machining roller.

5. An ultrasonic welding/cutting machine of claim 4, wherein the control means sets the machining speed and the turning angle of the machining roller on the basis of a post-machining shape set thereto.

6. An ultrasonic welding/cutting machine of claim 2, further comprising sheet feeding means for feeding the sheet material, horn rotating means for rotating the tool horn, and control means for controlling the sheet feeding means, the horn rotating means, the horn moving means, the roller rotating means, the roller moving means, and the roller turning means.

7. An ultrasonic welding/cutting machine of claim 6, wherein the control means sets a feed speed of the sheet material, a rotational speed of the tool horn, a moving speed of the tool horn, a rotational speed of the machining roller, and a moving speed of the machining roller on the basis of a machining speed at which welding or cutting for the sheet material progresses and a turning angle of the machining roller.

8. An ultrasonic welding/cutting machine of claim 7, wherein the control means sets the machining speed and the turning angle of the machining roller on the basis of a post-machining shape set thereto.

9. An ultrasonic welding/cutting machine of claim 2, which further comprises feed speed detecting means for detecting a feed speed of the sheet material, horn rotating means for rotating the tool horn, and control means for controlling the horn rotating means, the horn moving means, the roller rotating means, the roller moving means, and the roller turning means, and wherein the control means sets a rotational speed of the tool horn, a moving speed of the tool horn, a rotational speed of the machining roller, a moving speed of the machining roller, and a turning angle of the machining roller on the basis of the feed speed detected by the feed speed detecting means and a post-machining shape set thereto.

10. An ultrasonic welding/cutting machine of claim 2, which further comprises horn rotating means for rotating the tool horn and control means for controlling the horn rotating means, the horn moving means, the roller rotating means, the roller moving means, and the roller turning means, and wherein the control means sets a rotational speed of the tool horn, a moving speed of the tool horn, a rotational speed of the machining roller, a moving speed of the machining roller, and a turning angle of the machining roller on the basis of a feed speed of the sheet material and a post-machining shape both set thereto.

11. An ultrasonic welding/cutting machine of claim 1, further comprising sheet feeding means for feeding the sheet material and control means for controlling the sheet feeding means, the unit moving means, the roller rotating means, and the roller turning means.

12. An ultrasonic welding/cutting machine of claim 11, wherein the control means sets a feed speed of the sheet material, a moving speed of the ultrasonic machining unit, a rotational speed of the machining roller, and a moving speed of the machining roller on the basis of a machining speed at which welding or cutting for the sheet material progresses and a turning angle of the machining roller.

13. An ultrasonic welding/cutting machine of claim 1, wherein a plurality of the ultrasonic machining units and a plurality of the unit moving means are provided.

14. An ultrasonic welding/cutting machine of claim 1, which further comprises feed speed detecting means for detecting a feed speed of the sheet material and control means for controlling the unit moving means, the roller rotating means, the roller turning means, and wherein the control means sets a moving speed of the ultrasonic machining unit, a rotational speed of the machining roller, and a turning angle of the machining roller on the basis of the feed speed detected by the feed speed detecting means and a post-machining shape set thereto.

15. An ultrasonic welding/cutting machine of claim 14, further comprising horn rotating means for rotating the tool horn.

16. An ultrasonic welding/cutting machine of claim 1, which further comprises control means for controlling the unit moving means, the roller rotating means, and the roller turning means, and wherein the control means sets a moving speed of the ultrasonic machining unit, a rotational speed of the machining roller, and a turning angle of the machining roller on the basis of a feed speed of the sheet material and a post-machining shape both set thereto.

17. An ultrasonic welding/cutting machine of claim 16, further comprising horn rotating means for rotating the tool horn.

18. An ultrasonic welding/cutting machine of claim 1, further comprising sheet feeding means for feeding the sheet material, horn rotating means for rotating the tool horn, and control means for controlling the sheet feeding means, the unit moving means, the horn rotating means, the roller rotating means, and the roller turning means.

19. A data originating apparatus for an ultrasonic welding/cutting machine which includes an ultrasonic machining unit including a machining roller and a tool horn to which ultrasonic waves are transmitted, the ultrasonic machining unit welding or cutting a sheet material by feeding the sheet material between the machining roller and the tool horn, unit moving means for moving the ultrasonic machining unit in a direction generally perpendicular to a direction in which the sheet material is fed, roller rotating means for rotating the machining roller on a first axis thereof, and roller turning means for turning the machining roller on a second axis perpendicular to said first axis, the data originating apparatus comprising;

plotting means for plotting a post-machining shape obtained by machining the sheet material by the ultrasonic welding/cutting machine; and operation means for obtaining, by operation on the basis of the plotted post-machining shape, control data for controlling the unit moving means, the roller rotating means, and the roller turning means.

20. A storage medium for storing a program for operating an ultrasonic welding/cutting machine comprising an ultrasonic machining unit including a machining roller and a tool horn to which ultrasonic waves are transmitted, the ultrasonic machining unit welding or cutting a sheet material by feeding the sheet material between the machining roller and the tool horn, unit moving means for moving the ultrasonic machining unit in a direction generally perpendicular to a direction in which the sheet material is fed, roller rotating means for rotating the machining roller on a first axis thereof, and roller turning means for turning the machining roller on a second axis perpendicular to said first axis, the program accomplishing the function of control means for controlling the unit moving means, the roller rotating means, and the roller turning means.

* * * * *